United States Patent [19]

Inoue et al.

[11] Patent Number: 4,898,753

[45] Date of Patent: Feb. 6, 1990

[54] PROCESS FOR THE PREPARATION OF AROMATIC POLYIMIDE FILM

[75] Inventors: Hiroshi Inoue; Tadao Muramatsu; Yasuji Narahara; Tetsuji Hirano, all of Hirakata, Japan

[73] Assignee: UBE Industries, Ltd., Ube, Japan

[21] Appl. No.: 199,330

[22] Filed: May 26, 1988

[30] Foreign Application Priority Data

May 29, 1987 [JP] Japan .................................. 62-136365

[51] Int. Cl.$^4$ ........................... B05D 3/02; B05D 5/00
[52] U.S. Cl. ..................................... 427/276; 427/128; 427/379; 427/393.5; 428/473.5
[58] Field of Search ..................... 428/473.5; 427/128, 427/131, 379, 385.5, 393.5, 276

[56] References Cited

U.S. PATENT DOCUMENTS

| | | | |
|---|---|---|---|
| 4,470,944 | 9/1984 | Asakura et al. | 428/473.5 |
| 4,645,703 | 2/1987 | Suzuti et al. | 427/128 X |
| 4,755,424 | 7/1988 | Takeoka et al. | 428/473.5 X |

*Primary Examiner*—Michael Lusignan

*Attorney, Agent, or Firm*—Frishauf, Holtz, Goodman & Woodward

[57] ABSTRACT

A process for the preparation of an aromatic polyimide film having a surface provided with extremely small sized protrusions having an average diameter of 40 to 2,000 angstroms, the number of protrusions being in the range of $1 \times 10^4$ to $1 \times 10^9/mm^2$ is disclosed. The process comprises the steps of coating a coating composition (aromatic polyamic acid solution containing inorganic particles having an average diameter of not larger than 1,000 angstroms) on at least one surface of an aromatic polyimide gel film containing a volatile material in an amount of 10 to 90 wt. % (aromatic polyimide gel film has been obtained by ring closure and imidation of an aromatic polyamic acid in an organic polar oslvent containing a dehydrating agent and a catalyst at a temperature of not higher than 200° C.); drying the obtained film composite at a temperature of 50° to 200° C.; and subjecting the film composite to a heat treatment including heating at a temperature of not lower than 300° C.

25 Claims, No Drawings

PROCESS FOR THE PREPARATION OF AROMATIC POLYIMIDE FILM

BACKGROUND OF THE INVENTION

1. Field of the Invention

The present invention relates to a process for the preparation of an aromatic polyimide film having a surface provided with extremely small sized protrusions, and more particularly to a process for the preparation of an aromatic polyimide film which is useful as a base film of a recording medium employed in high-density recording system.

2. Description of Prior Art

A polyethylene terephthalate film has been heretofore used as a support (i.e., base film) of a magnetic recording medium, because the polyethylene terephthalate film is excellent in various properties such as heat resistance, mechanical strength and surface smoothness, and further it is obtainable at a low cost. Recently, there is demand for a higher density recording system, prolonged recording period, higher quality of recorded image and a smaller sized and light-weight medium, and hence a magnetic recording medium having a metal thin layer of a magnetic recording material such as Co, Cr, Ni, Fe or an alloy thereof formed on a base film by sputtering or vacuum deposition has been widely studied.

In the case of forming the metal thin layer (i.e., magnetic recording layer) on the base film by the process such as sputtering, the temperature of the base film rises to over 200° C. due to an energy given by collision of metal particles to the film, even when the base film is not heated. Further, depending on the nature of the employed metal, the base film may be heated at a temperature of higher than 200° C. to form a metal thin layer thereon in order to improve magnetic properties such as coercive force or to improve adhesion between the metal thin layer and the base film. Accordingly, as the base film of a magnetic recording medium in which a metal thin layer (magnetic recording layer) is formed by the process such as sputtering or vacuum deposition, the polyethylene terephthalate film is not satisfactory because the film does not have sufficient heat resistance. There is known a process where a magnetic recording layer is formed on a base film having poor heat resistance such as a polyethylene terephthalate film by sputtering and the like, under the condition that the base film is cooled during the sputtering and the like. However, the magnetic recording layer obtained in this process sometimes decreases in the magnetic properties or shows unsatisfactory adhesion to the base film, so that this process is unsuitable as a process for preparing a magnteic recording medium of high qualities.

For these reasons, it has been proposed to use an aromatic polyimide film having high heat resistance as a base film of a magnetic recording medium of high qualities.

It is generally known that various properties of magnetic recording media such as electromagnetic conversion characteristics, smooth running property and running endurance greatly depend on the surface condition of the magnetic recording layer, and hence many studies for improvement of the surface condition of the magnetic recording layer have been made.

A metallic recording layer of a magnetic recording medium generally has a thickness of approx. 1,000 to 5,000 angstroms, and the layer is prominently thinner than that of the coated magnetic recording layer of a conventional recording medium. Hence, the surface conditions of the base film are reproduced on the surface of the magnetic recording layer. Accordingly, the improvement of various properties of the magnetic recording layer (i.e., metal thin layer) such as electromagnetic conversion characteristics, smooth running property and running endurance can be accomplished by providing a favorable shape or conditions to a surface of the base film. In more detail, if the surface of the base film is too rough, that is, the surface of the surface of the recording layer is too rough, the distance between the recording layer and a magnetic head in the recording and reproducing procedures becomes to large, whereby the output level lowers owing to so-called spacing loss. Further, existence of coarse protrusions on the surface of the base film causes drop-out phenomenon. On the contrary, if the surface of the base film is too smooth, there arise other problems such as problems in head-touch property, smooth running property, etc.

For coping with the above-described problems relating to running properties, there has been heretofore proposed a process of incorporating organic or inorganic fine particles into a base film of polyethylene terephthalate to form a number of extremely small sized protrusions on the surface of the base film, or a process of coating a solution comprising organic or inorganic fine particles, a resin binder and a solvent onto the surface of the base film and drying the coated layer of the solution to form a number of small sized protrusions. Particularly, the latter process is very effective for improving the running properties of the resulting magnetic recording medium.

As described hereinbefore, a heat-resistant base film is required to be used for forming a magnetic recording layer thereon by sputtering and the like. However, in the case of using an aromatic polyimide film as the heat-resistant base film, the aforementioned processes for the polyethylene terephthalate film can hardly prepare a desired base film of high qualities.

In more detail, in the former process (process of introducing fine particles into the base film), the strength of the base film is lowered, and hence the resulting magnetic recording medium can be hardly used practically. In the latter process (process of coating a resin binder solution on the base film), the resin binder used therefor is also required to be heat-resistant. However, there is not known a solvent capable of dissolving such heat-resistant resin binder and having wettability to the aromatic polyimide film, so that it is almost impossible to uniformly form a number of extremely small sized protrusions on the surface of the aromatic polyimide film by the latter process.

SUMMARY OF THE INVENTION

It is an object of the present invention to provide a process for preparing with industrial reproducibility an aromatic polyimide film provided with a number of extremely small sized protrusions on the surface, which is suitably employed as a base film of a magnetic recording medium improved in head touch (touch with a magnetic head) or running properties and is reduced in spacing loss and drop-out.

There is provided by the present invention a process for the preparation of an aromatic polyimide film having a surface provided with extremely small sized protrusions having an average diameter of 40 to 2,000 angstroms, the number of protrusions being in the range of $1\times10^4$ to $1\times10^9/mm^2$, which comprises the steps of coating an aromatic polyamic acid solution containing inorganic particles having an average diameter of not larger than 1,000 angstroms on at least one surface of an aromatic polyimide gel film containing a volatile material in an amount of 10 to 90 wt. %, said aromatic polyimide gel film having been obtained by ring closure and imidation of an aromatic polyamic acid in an organic polar solvent containing a dehydrating agent and a catalyst at a temperature of not higher than 200° C.; drying the obtained film composite at a temperature of 50° to 200° C.; and subjecting the film composite to a heat treatment including heating at a temperature of not lower than 300° C.

The aromatic polyimide film prepared by the process of the present invention has its main body made of an aromatic polyimide which shows sufficiently high resistance to high temperatures, so that the aromatic polyimide film shows satisfactorily high heat resistance even when subjected to various treatments such as sputtering, metallization (metal deposition) and ion plating of magnetic metals such as Co, Cr, Ni and Fe and their alloys, which are carried out at a high temperature of approx. 200° to 600° C. in the conventional process for preparing a metallic recording layer-type magnetic recording medium. Hence, the aromatic polyimide film prepared by the process of the invention is very useful as a base film of a magnetic recording medium of high performance.

The aromatic polyimide film prepared by the process of the invention is provided with appropriately protruded and depressed portions on its surface, so that when a magnetic recording layer is formed thereon through sputtering, deposition, ion plating, etc., the favorable protruded and depressed portions are formed also on the surface of the magnetic recording layer. Accordingly, in the case of using the aromatic polyimide film as a base film, the resulting magnetic recording medium can be improved in smooth running property, running endurance and recovery from clogging on a magnetic head without lowering electromagnetic conversion characteristics such as output level and occurrence of drop-out phenomenon.

DETAILED DESCRIPTION OF THE INVENTION

The aromatic polyamic acid employed in the process of the invention preferably is one obtained by polymerizing an aromatic diamine component and an aromatic tetracarboxylic acid component preferably in almost the same number of moles as each other in an organic polar solvent. Such aromatic polyamic acid can be prepared according to known methods.

Examples of the aromatic diamine components include benzene diamines such as 1,4-diaminobenzene, 1,3-diaminobenzene and 1,2-diaminobenzene, diphenyl(thio)ether diamines such as 4,4'-diaminodiphenylether, 3,4'-diaminodiphenylether, 3,3'-diaminodiphenylether and 4,4'-diaminodiphenylthioether, benzophenone diamines such as 3,3'-diaminobenzophenone and 4,4'-diaminobenzophenone, diphenylphosphine diamines such as 3,3'-diaminodiphenylphosphine and 4,4'-diaminodiphenylphosphine, diphenylalkylene diamines such as 3,3'-diaminodiphenylmethane, 4,4'-diaminodiphenylmethane, 3,3'-diaminodiphenylpropane and 4,4'-diaminodiphenylpropane, diphenylsulfide diamines such as 3,3'-diaminodiphenylsulfide and 4,4'-diaminodiphenylsulfide, diphenylsulfone diamines such as 3,3'-diaminodiphenylsulfone and 4,4'-diaminodiphenylsulfone, and benzidines such as benzidine and 3,3'-dimethylbenzidine.

These aromatic diamines can be employed singly or in combination. Preferably employed as the aromatic diamine component are 1,4-diaminobenzene, 4,4'-diaminodiphenylether and a mixture thereof.

As the aromatic tetracarboxylic acid component, there can be mentioned aromatic tetracarboxylic acids, acid anhydrides thereof, salts thereof and esters thereof. Examples of the aromatic tetracarboxylic acids include 3,3',4,4'-biphenyltetracarboxylic acid, 2,3',3,4'-biphenyltetracarboxylic acid, pyromellitic acid, 3,3',4,4'-benzophenonetetracarboxylic acid, 2,2-bis(3,4-dicarboxyphenyl)propane, bis(3,4-dicarboxyphenyl)methane, bis(3,4-dicarboxyphenyl)ether, bis(3,4-dicarboxyphenyl)thioether, bis(3,4-dicarboxyphenyl)phosphine, and bis(3,4-dicarboxyphenyl)sulfone.

These aromatic tetracarboxylic acids can be employed singly or in combination. Preferred is an aromatic tetracarboxylic dianhydride, and particularly preferred are 3,3',4,4'-biphenyltetracarboxylic dianhydride, pyromellitic dianhydride and a mixture thereof.

As the organic polar solvent employable in the above-described polymerization reaction, there can be mentioned solvents capable of homogeneously dissolving each monomer of the aromatic diamine component or the aromatic tetracarboxylic acid component, an oligomer produced by the monomers or a low-molecular polyamic acid. Examples of such organic polar solvents include amide solvents such as N,N-dimethylformamide, N,N-dimethylacetamide, N-methyl-2-pyrrolidone and N-methylcaprolactam, dimethylsulfoxide, hexamethylsulfolamide, dimethylsulfone, tetramethylenesulfone, dimethyltetramethylenesulfone, pyridine and ethylene glycol. These organic polar solvents can be used in combination with other solvents such as benzene, toluene, benzonitrile, xylene, solvent naphtha and dioxane.

For performing the polymerization reaction, the amount of all monomers in the organic polar solvent is preferably in the range of 5 to 40 wt. %, more preferably in the range of 6 to 35 wt. %, most preferably in the range of 10 to 30 wt. %.

The polymerization reaction of the aromatic tetracarboxylic acid component and the aromatic diamine component can be carried out, for example, by adding both components in substantially the same number of moles as each other to the above-mentioned organic polar solvent and mixing therewith. The temperature for the polymerization reaction generally is not higher than 100° C., preferably in the range of 10° to 80° C., and the time for the polymerization reaction generally is in the range of approx. 0.2 to 60 hours.

The organic polar solvent solution of the aromatic polyamic acid employed for the preparation of an aromatic polyimide gel film in the process of the invention generally has a viscosity (at 30° C.) of approx. 0.1 to 50,000 P (poise, measured by a rotationary viscometer), preferably 0.5 to 30,000 P, more preferably 1 to 20,000 P, from the viewpoint of workability. Accordingly, the above-stated polymerization reaction is desired to be continued until the resulting organic polar solvent solution of the aromatic polyamic acid has the above-defined viscosity.

Into the aromatic polyamic acid solution prepared as above are incorporated a dehydrating agent and a catalyst to perform a reaction at a temperature of not higher than 200° C., preferably in the range of 40° to 200° C., whereby the aromatic polyamic acid is ring-closed and imidized to prepare an aromatic polyimide gel film having a volatile material content of 10 to 90 wt. %.

Examples of the dehydrating agents employable in the invention include organic acid anhydrides such as aliphatic acid anhydrides, aromatic acid anhydrides, alicyclic acid anhydrides, heterocyclic acid anhydrides and mixtures of two or more kinds thereof. Concrete examples of the organic acid anhydrides are acetic anhydride, propionic anhydride, lactic anhydride, formic anhydride, succinic anhydride, maleic anhydride, phthalic anhydride, benzoic anhydride, and picolinic anhydride. Particularly preferred is acetic anhydride.

Examples of the catalyst employable in the invention include organic tertiary amines such as aliphatic tertiary amine, aromatic tertiary amine, heterocyclic tertiary amine and mixtures of two or more kinds thereof. Concrete examples of the organic tertiary amines are trimethylamine, triethylemine, dimethylaniline, pyridine, β-picoline, isoquinoline and quinoline. Particularly preferred is isoquinoline.

There is no specific limitation on the order of adding the above-mentioned dehydrating agent and catalyst to the aromatic polyamic acid solution. For example, to the aromatic polyamic acid solution may be added first the catalyst and then the dehydrating agent, or a homogeneous mixture of the dehydrating agent and the catalyst may be added to the aromatic polyamic acid solution. The aromatic polyamic acid solution may contain other components than the above-mentioned dehydrating agent and the catalyst, such as a retardant (e.g., acetylacetone).

The amount of the dehydrating agent to be added to the aromatic polyamic acid solution is preferably not less than 0.5 mole per 1 mole of an amic acid bonding of the aromatic polyamic acid component contained in the aromatic polyamic acid solution. When the amount of the dehydrating agent is less than 0.5 mole, the ring closure - imidation of an amic acid bonding of the polyamic acid is insufficiently performed.

The amount of the catalyst to be added to the aromatic polyamic acid solution is preferably not less than 0.1 mole per 1 mole of an amic acid bonding of the aromatic polyamic acid component contained in the aromatic polyamic acid solution. When the amount of the catalyst is less than 0.1 mole, the imidation reaction progresses too slowly.

An aromatic polyimide gel film can be prepared from the the above-mentioned aromatic polyamic acid solution according to known methods. For example, the aromatic polyamic acid solution containing the dehydrating agent and the catalyst is cast on a surface of an appropriate support (e.g., a roll sheet made of metal, ceramic or plastic and a metallic belt) to form on the support a film having a uniform thickness (thickness in solution film basis) of approx. 10 to 2,000 μm, preferably 20 to 1,000 μm. The film is then heated at a temperature of not higher than 200° C., preferably in the range of 40° to 200° C., utilizing a heat source such as a hot air or infrared rays to perform ring-closure and imidation of the aromatic polyamic acid. Thus, an aromatic polyimide gel film can be prepared. The above-mentioned heating is continued until the volatile material content in the gel film is adjusted in the range of 10 to 90 wt. %, preferably in the range of 20 to 85 wt. %. The gel film prepared as above is self-supporting, so that the film can be separated from the support.

The amount of the volatile material content in the gel film is referred to hereinafter as "heating loss". For determining the heating loss, the aimed gel film is dried at 420° C. for 20 minutes. The weight of the film measured prior to the drying ($W_1$) and the weight thereof measured after the drying ($W_2$) are introduced into the following equation to determine the heating loss:

$$\text{Heating loss (wt. \%)} = [(W_1 - W_2)/W_1] \times 100.$$

As the heating loss is high, the surface tension of the gel film is high and the surface of the gel film has better wettability in the later stage of coating the coating composition over the gel film, so that the heating loss preferably has a higher value within the above-mentioned range. If the heating loss is higher than the upper limit of the above-mentioned range, there arise various drawbacks such that the gel film has too low self-supporting property to uniformly coat the coating composition thereon in the subsequent coating stage, or the gel film and the coating composition are too miscible with each other to form a layer of desired structure (thickness, protrusions, etc.) from the coating composition.

If the dehydrating agent and the catalyst are not employed in the preparation of a gel film, the tensile strength of the surface of the resulting gel film is too low, resulting in troubles in the subsequent coating procedure of the coating composition over the gel film. Further, since such gel film has poor wettability, the coating composition cannot be uniformly coated thereon, or solvent-crazing easily takes place.

In the process of the present invention, at least one surface of the aromatic polyimide gel film prepared as above is then coated with an aromatic polyamic acid solution which contains inorganic particles having an average diameter of not larger than 1,000 angstroms.

The aromatic polyamic acid solution for the coating can be prepared in the similar manner to that described with respect to the preparation of the above-mentioned aromatic polyimide gel film. That is, the aromatic diamine component and aromatic tetracarboxylic acid component are polymerized in the organic polar solvent under the aforementioned polymerization conditions. In this process, however, the dehydrating agent and the catalyst are not always necessary.

The aromatic polyamic acid solution for the coating composition preferably has a concentration of the aromatic polyamic acid (including starting material components) in the organic polar solvent in the range of 0.005 to 20 wt. %, more preferably in the range of 0.01 to 15 wt. %, and preferably has a viscosity (at 30° C., in the specification, the value is measured by a rotational viscometer) of 0.007 to 1,000 P, more preferably 0.01 to 100 P.

The inorganic particles contained in the coating composition are those having an average diameter of not larger than 1,000 angstroms, preferably in the range of 40 to 1,000 angstroms, more preferably in the range of 100 to 800 angstroms.

As the inorganic particles, there can be employed particles of silica, titanium dioxide, aluminum oxide and other inert inorganic materials, provided that they have an average particle diameter of the above-stated range. However, it may be difficult to obtain such extremely small sized particles of those inorganic materials, so that preferably employed is colloidal silica.

It may be difficult to incorporate extremely fine particles of silica anhydride prepared by firing purified silicon tetrachloride, extremely fine particles of titanium dioxide or aluminum oxide or other inorganic fine particles in dry, solid state prepared by the same vapor phase method, into an aromatic polyamic acid solution, so long as the incorporation is done by known procedures.

In more detail, since these dry particles are generally in the agglomerated state of primary particles, the agglomerates of the particles can be hardly divided into each particle, even if the particles are subjected to a dispersing procedure using a conventional dispersing apparatus such as a homomixer, a sand mill or an ultrasonic homogenizer prior to introducing the particles into the aromatic polyamic acid solution or a solution of starting materials of the aromatic polyamic acid. Hence, those particles are dispersed in the aromatic polyamic acid solution in the agglomerated state of secondary or tertiary particles having a wide particle diameter distribution in which several or ten or more primary particles are agglomerated.

Even if the above-mentioned particles are subjected to classification by means of centrifugal separation, filtration, etc. in order to narrow the particle diameter distribution, it is almost impossible to obtain preferred particles having the above-mentioned average diameter according to the invention, although particles of larger than a certain size can be removed, that is, so-called "overcut" can be made.

On the other hand, colloidal silica is dispersed in water, alcohol or a mixture thereof in the state of extremely fine particles having an average diameter of not larger than 1,000 angstroms, to form an aqueous sol (or aqueous dispersion) of colloidal silica, an alcohol sol (or alcohol dispersion) of colloidal silica, etc. When water or alcohol contained in the sol is substituted by an organic polar amide solvent such as N-methyl-2-pyrrolidone, N-N-dimethylacetamide and N,N-dimethylformamide, an organic polar amide solvent sol (dispersion) of colloidal silica can be obtained. Accordingly, in the case of using an organic polar amide solvent sol of colloidal silica, the particle diameter distribution of colloidal silica varies even less in the organic polar amide solvent and the aromatic polyamic acid solution. For this reason, colloidal silica can maintain its state of extremely fine particles in the coating composition.

Colloidal silica is commercially available in the form of an aqueous sol and an alcohol sol (e.g., a sol containing colloidal silica dispersed in a lower-alcohol such as methanol). Examples of the aqueous sol of colloidal silica and the alcohol sol of colloidal silica include a variety of commercially available products such as Snowtex (trade name of Nissan Chemical Co., Ltd.), Cataloid (trade name of Catalyst Chemical Industries Co. Ltd.).

In the process of the invention, the above-mentioned aqueous sol or alcohol sol of colloidal silica is preferably diluted with an organic polar amide solvent, and if necessary, subjected to dehydration or removal of alcohol therefrom by means of vacuum distillation. Otherwise, to the aqueous sol or the alcohol sol is preferably added an organic polar amide solvent under removing water or alcohol therefrom to substitute water or alcohol by the organic polar amide solvent.

Further, those sols of colloidal silica may be subjected to a dispersing procedure such as mechanical dispersing or ultrasonic dispersing, or may be subjected to classification by means of filtration or centrifugal separation.

The coating composition employed in the invention contains the above-mentioned inorganic particles preferably in an amount of 0.01 to 10.0 wt. %, more preferably 0.01 to 6.0 wt. %. When the amount of the inorganic particles is less than the lower limit of the above-specified range, the surface of the resulting aromatic polyimide film can be hardly imparted the satisfactory smooth running property. When the amount thereof is exceeds the upper limit of the range, the inorganic particles tend to lie one upon another, whereby extremely small sized protrusions of uniform height cannot be formed on the the surface of the resulting aromatic polyimide film. As a result, a layer provided on the surface of the aromatic polyimide film is apt to decrease in mechanical properties.

The coating composition employable in the invention can be prepared by an optional process. For example, to the organic polar solvent dispersion of colloidal silica obtained as described hereinbefore is directly added monomers of the starting materials such as an aromatic tetracarboxylic acid component and an aromatic diamine component to perform polymerization reaction, so as to prepare a coating composition of an aromatic polyamic acid solution. Otherwise, the aromatic diamine component and the aromatic tetracarboxylic acid component in different molar ratio are polymerized to prepare a solution of low viscosity. To the solution is then added the aforementioned colloidal silica dispersion, and they are well stirred. After the stirring, the other components are added to the solution to further perform polymerization reaction, so as to prepare an aromatic polyamic acid solution. Alternatively, to an aromatic polyamic acid having been beforehand prepared by polymerization reaction is added the aforementioned colloidal silic dispersion to prepare the coating composition.

As described above, the colloidal silica dispersion can be used in any optional stage of the process for the preparation of the coating composition.

In each of the above-described cases, it is particularly preferred that almost all of the inorganic particles are dispersed homogeneously in the coating composition in the state of primary particles.

In the case of using other inorganic materials than the colloidal silica, the similar methods to those described above are employed in the invention.

The coating composition prepared as above is then coated on the surface of the gel film. The coating can be carried out by a variety of known methods such as methods of using a blade coater, a knife coater, an impregnating coater, a reverse roll coater, a gravure coater and a kiss roll coater.

The coating composition is coated on the surface of the gel film preferably in an amount of 0.5 to 35 wt. %, more preferably 1 to 30 wt. %, of the gel film, in dry basis.

The coating of the coating composition may be done on only one surface of the gel film or both surfaces of the gel film.

Subsequently, the gel film with the coated layer of the composition (i.e., film composite) is dried at a temperature of 50° to 200° C., and then the film composite is subjected to a heat treatment including heating at a temperature of not lower than 300° C. and another heating at a temperature of 300° to 500° C., to prepare an aromatic polyimide film having a surface provided with extremely small sized protrusions having an average diameter of 40 to 2,000 angstroms, preferably 60 to 1,800 angstroms, and a maximum height of 50 to 500 angstroms, the number of protrusions being $1 \times 10^4$ to $1 \times 10^9/mm^2$, preferably $5 \times 10^5$ to $5 \times 10^8/mm^2$.

The heat treatment is not always required to be carried out at temperatures of not lower than 300° C. throughout the whole stage. It is enough that at least a part of the heat treatment (preferably the end part thereof) is carried out at a temperature of not lower than 300° C., preferably in the range of 300° to 500° C. For example, the heat treatment may be a plural-step heating such as a two-step heating comprising first heating at about 200° C. and subsequent heating at about 400° C. The heat treatment may be carried out at a temperature of not lower than 300° C. without varying the temperature, but even in this case, the film composite is essentially heat-treated for a period of time where the temperature rises to reach 300° C.

When the number of protrusions are less than the lower limit of the above-specified range, a magnetic recording medium obtained by using the resulting aromatic polyimide film as a base film is not improved in smooth running property of the magnetic recording layer and running endurance thereof. When the number of protrusions exceeds the upper limit of the above-specified range, the magnetic recording medium deteriorates in running properties.

The protrusions on the surface of the aromatic polyimide film prepared by the process of the invention preferably has a maximum height in the range of 50 to 500 angstroms. When the maximum height thereof is lower than 50 angstroms, the smooth running property of the magnetic recording medium tends to deteriorate, and when the maximum height thereof exceeds 500 angstroms, the electromagnetic conversion characteristics of the magnetic recording medium tends to deteriorate.

The above-mentioned drying procedure and the heat treatment can be done using various known devices such as a hot air oven and an infrared rays-heating oven. The heat treatment is preferably continued until the volatile material content in the aromatic polyimide film becomes less than 0.1 wt. %.

The examples and the comparison examples of the present invention are given below.

In each of the examples and the comparison examples, the physical properties of the aromatic polyimide film were evaluated as follows.

(1) Average diameter of protrusions

The film surface is photographed using a scanning electron microscope at 10,000–30,000 magnifications. In the obtained photograph of the film surface, circular approximated diameters of the protrusions are measured by means of an image processer of PIAS-IIE8 type (produced by PIAS Co., Ltd.) to determine an average diameter.

(2) Number of protrusions

The film surface is photographed using a scanning electron microscope at 10,000–30,000 magnifications. In the obtained photograph of the film surface, the number of the protrusions are measured by means of the above-mentioned image processer.

(3) Surface tension of film surface

The surface tension of the film surface is measured using a wet index-standard liquid (available from Wako Medical Industries Co., Ltd.).

EXAMPLE 1

Into a 20 l polymerization cylinder were introduced 6,200 g. of N,N-dimethylacetoamide (DMAc) and 270.35 g. (2.5 moles) of p-phenylenediamine (PPD), and they were stirred in a nitrogen atmosphere at room temperature (approx. 30° C.). To the obtained solution was added 735.55 g. (2.5 moles) of 3,3',4,4'-biphenyltetracarboxylic dianhydride (s-BPDA), and they were stirred for 6 hours to prepare a polyamic acid solution. The viscosity (at 30° C.) of the solution was 1,300 P. The viscosity was measured using an E-type viscometer (produced by Tokyo measuring Apparatus Co., Ltd.).

To the obtained 14 wt. % polyamic acid solution were added 80.7 g. (0.63 mole) of isoquinoline, 510.5 g. (5.0 moles) of acetic anhydride and 3,050 g. of DMAc. The obtained solution was extruded using a T-die over an endless rotating metallic belt to form a film of the solution on the belt. The film was dried by applying a hot air of 65° C. onto the surface of the film for 15 minutes to prepare a gel film. The gel film had a heating loss of 76 wt. % and a surface tension of 37 dyne/cm.

Independently, a 14 wt. % polyamic acid solution was prepared using 620 g. of N,N-dimethylacetamide, 27.035 g. (0.25 mole) of PPD and 73,555 g. (0.25 mole) of s-BPDA. A portion of the solution was diluted with DMAc to prepare a 1 wt. % aromatic polyamic acid solution.

To the aromatic polyamic acid solution was added a 4 wt. % DMAc dispersion of colloidal silica having an average particle diameter of 225 angstroms (BET) in such an amount that the colloidal silica would be 100 wt. % of (equivalent to) the polyamic acid, and the dispersion was diluted with DMAc in such a manner that the concentration of the polyamic acid would be 0.1 wt. %, to prepare a coating composition. The coating composition had a viscosity (at 30° C.) of not more than 1 P.

The coating composition was coated over the gel film obtained above in an amount of 6 wt. % of the gel film in dry basis at a rate of 5 m/min. using a gravure coater (#200, lattice type). The obtained film composite was dried at 80° C. in a hot air oven. Thereafter, the film composite was subjected to a heat treatment in a high-temperature oven comprising heating first at 200° C. for 3 minutes, then at 310° C. for 3 minutes, further at 440° C. for 3 minutes and finally at 350° C. for 3 minutes while continuously moving the film composite in the oven by means of a pin tenter, to prepare an aromatic polyimide film having thickness of 12.5 μm. The obtained aromatic polyimide film was evaluated on the surface condition. The results are as follows.

Average diameter of protrusions: 430 angstroms
Number of protrusions: $3.4 \times 10^7/mm^2$

COMPARISON EXAMPLE 1

The procedure for preparing a gel film in Example 1 was repeated except for not using isoquinoline and acetic anhydride to prepare a polyamic acid and drying the extruded film on the metallic belt by applying a hot air of 100° C. for 15 minutes, to prepare a gel film. The gel film had a heating loss of 45.5 wt. % and a surface tension of 33 dyne/cm. Onto the gel film was coated the same coating composition as used in Example 1 in the same manner as described in Example 1. However, a number of small cracks were produced on the surface of the gel film, whereby a satisfactory coated layer was not obtained. Further, on the surface of the obtained aromatic polyimide film was observed agglomerates of colloidal silica.

EXAMPLE 2

The procedure of Example 1 was repeated except for using a coating composition containing 1 wt. % of polyamic acid and 0.5 wt. % of colloidal silica, to prepare an aromatic polyimide film. The obtained aromatic polyimide film was evaluated on the surface condition. The results are as follows.

Average diameter of protrusions: 560 angstroms
Number of protrusions: $1.2 \times 10^8/mm^2$

EXAMPLE 3

The procedure of Example 1 was repeated except for varying the average particle diameter of colloidal silica contained in the coating composition to 450 angstroms (BET), to prepare an aromatic polyimide film. The obtained aromatic polyimide film was evaluated on the surface condition. The results are as follows.

Average diameter of protrusions: 780 angstroms
Number of protrusions: $2.8 \times 10^7/mm^2$

EXAMPLE 4

The procedure of Example 1 was repeated except for varying the amount of the polyamic acid contained in the coating composition to 6 wt. %, to prepare an aromatic polyimide film. The obtained aromatic polyimide film was evaluated on the surface condition. The results are as follows.

Average diameter of protrusions: 950 angstroms
Number of protrusions: $5.4 \times 10^6/mm^2$

EXAMPLE 5

The procedure of Example 1 was repeated except for varying the average particle diameter of colloidal silica contained in the coating composition to 150 angstroms (BET), to prepare an aromatic polyimide film. The obtained aromatic polyimide film was evaluated on the surface condition. The results are as follows.

Average diameter of protrusions: 280 angstroms
Number of protrusions: $4.8 \times 10^7/mm^2$

EXAMPLE 6

The procedure for preparing a gel film in Example 1 was repeated except for drying the extruded film on the metallic belt by applying a hot air of 100° C. for 15 minutes to prepare a gel film. The obtained gel film had a heating loss of 43.6 wt. % and a surface tension of 36 dyne/cm.

Using the obtained gel film, an aromatic polyimide film was prepared in the same manner as described in Example 1. The obtained aromatic polyimide film was evaluated on the surface condition. The results are as follows.

Average diameter of protrusions: 390 angstroms
Number of protrusions: $3.1 \times 10^7/mm^2$

EXAMPLE 7

The procedure for preparing a gel film in Example 1 was repeated except for drying the extruded film on the metallic belt by applying a hot air of 150° C. for 15 minutes to prepare a gel film. The obtained gel film had a heating loss of 36.0 wt. % and a surface tension of 36 dyne/cm.

Using the obtained gel film, an aromatic polyimide film was prepared in the same manner as described in Example 1. The obtained aromatic polyimide film was evaluated on the surface condition. The results are as follows.

Average diameter of protrusions: 410 angstroms
Number of protrusions: $3.0 \times 10^7/mm^2$

COMPARISON EXAMPLE 2

The procedure of Example 1 was repeated except for varying the amount of polyamic acid contained in the coating composition to 0 wt. %, to prepare an aromatic polyimide film. On the surface of the obtained aromatic polyimide film were observed agglomerates of colloidal silica, and the surface of the film was not uniform.

COMPARISON EXAMPLE 3

The procedure of Example 1 was repeated except for varying the amount of colloidal silica contained in the coating composition to 0 wt. %, to prepare an aromatic polyimide film. On the surface of the obtained aromatic polyimide film were hardly observed protrusions.

EXAMPLE 8

Into a 10 l polymerizing cylinder were introduced 4,480 g. of DMAc, 227.09 g. (2.1 moles) of PPD and 180.22 g. (0.9 mole) of 4,4'-diaminodiphenylether, and they were stirred in a nitrogen atmosphere at room temperature (approx. 30° C.). To the obtained solution were added 441.33 g. (1.5 moles) of s-BPDA and 327.18 g. (1.5 moles) of pyromellitic dianhydride, and they were stirred for 6 hours to prepare a polyamic acid solution. The solution had a viscosity (at 30° C.) of 1,700 P.

To the 20 wt. % polyamic acid solution were added 96.87 g. (0.75 mole) of isoquinoline, 612.54 g. (6.0 moles) of acetic anhydride and 2,033 g. of DMAc. The obtained solution was processed in the same manner as describe in Example 1 to prepare a gel film. The gel film had a heating loss of 74 wt. % and a surface tension of 37 dyne/cm.

Using the gel film, an aromatic polyimide film was prepared in the same manner as described in Example 1. The obtained aromatic polyimide film was evaluated on the surface condition. The results are as follows.

Average diameter of protrusions: 420 angstroms
Number of protrusions: $3.2 \times 10^7/mm^2$

EVALUATION OF POLYIMIDE FILM

On the surface of the aromatic polyimide film obtained in each of the above-mentioned examples was formed a Co-Cr alloy thin film having thickness of 0.2 μm through vacuum deposition (performed at approx. 200° C.), and the obtained laminate was slit into a video tape having width of 8 mm.

The obtained video tape was evaluated on smooth running property, running endurance, output (reproduction output) and occurrence of drop-out (DO) according to a test using a commercially available 8 mm type video reproduction device and a drop-out counter. The results are set forth in Table 1.

The results of the evaluations are expressed on the basis of evaluated values with respect to a reference 8 mm type video tape in the case of using a commercially avilalbe 8 mm type video tape (using a polyethylene terephthalate base film) as the reference video tape.

The results of the evaluations are classified in to the following:

A: superior to the reference 8 mm type video tape;
B: almost the same level as that of the reference 8 mm type video tape; and C: inferior to the reference 8 mm type video tape.

TABLE 1

|  | Number of Protrusions (per 1 mm$^2$) | Smooth Running | Running Endurance | Output | DO |
|---|---|---|---|---|---|
| Example 1 | 3.4 × 10$^7$ | B | A | A | A |
| Example 2 | 12 × 10$^7$ | B | A | A | A |
| Example 3 | 2.8 × 10$^7$ | B | A | A | A |
| Example 4 | 0.54 × 10$^7$ | B | A | A | A |
| Example 5 | 4.8 × 10$^7$ | B | A | A | A |
| Example 6 | 3.1 × 10$^7$ | B | A | A | A |
| Example 7 | 3.0 × 10$^7$ | B | A | A | A |
| Example 8 | 3.2 × 10$^7$ | B | A | A | A |
| Com. Ex. 2 | immeasurable | B | B | C | C |
| Com. Ex. 3 | none | C | C | A | A |

We claim:

1. A process for the preparation of an aromatic polyimide film having a surface provided with protrusions having an average diameter of 40 to 2,000 angstroms, the number of protrusions being in the range of $1 \times 10^4$ to $1 \times 10^9/\text{mm}^2$, which comprises the steps of coating an aromatic polyamic acid solution containing inorganic particles having an average diameter of not larger than 1,000 angstroms on at least one surface of an aromatic polyimide gel film containing a volatile material in an amount of 10 to 90 wt. %, said aromatic polyimide gel film having been obtained by ring closure and imidation of an aromatic polyamic acid in an organic polar solvent containing a dehydrating agent and a catalyst at a temperature of not higher than 200° C. to form a composite of said gel film having a coated surface containing said inorganic particles; drying said film composite at a temperature of 50° to 200° C.; and heat treating the dried film composite at a temperature of not lower than 300° C. to form said polyimide film having said surface protrusions.

2. The process as claimed in claim 1, wherein said aromatic polyamic acid is obtained by polymerizing an aromatic diamine component and an aromatic tetracarboxylic acid component in an organic polar solvent.

3. The process as claimed in claim 1, wherein said dehydrating agent is an organic acid anhydride.

4. The process as claimed in claim 3, wherein said organic acid anhydride is acetic anhydride.

5. The process as claimed in claim 1, wherein said catalyst is a tertiary amine.

6. The process as claimed in claim 5, wherein said tertiary amine is isoquinoline.

7. The process as claimed in claim 1, wherein said inorganic particles are inert inorganic particles having an average diameter of 40 to 1,000 angstroms.

8. The process as claimed in claim 7, wherein said inorganic particles are colloidal silica.

9. The process as claimed in claim 1, wherein said aromatic polyamic acid solution for the coating contains the inorganic particles in an amount of 0.001 to 10.0 wt. %.

10. The process as claimed in claim 1, wherein said aromatic polyamic acid solution is coated on the surface of the aromatic polyimide gel film in an amount of 0.5 to 35 wt. % of the gel film on a dry basis.

11. The process as claimed in claim 1, wherein the protrusions on the surface of the aromatic polyimide film prepared by the process has a maximum height in the range of 50 to 500 angstroms.

12. The process as claimed in claim 2, wherein said aromatic polyimide gel film contains said volatile material in an amount of 20 to 85 wt. % and said inorganic particles have an average diameter of 100 to 800 angstroms.

13. The process as claimed in claim 2, wherein said aromatic polyamic acid solution for the coating contains the inorganic particles in an amount of 0.01 to 6 wt. % and said aromatic polyamic acid solution is coated on the surface of the aromatic polyimide gel film in an amount of 1 to 30 wt. % of the gel film on a dry basis.

14. The process as claimed in claim 2, wherein said protrusions have an average diameter of 60 to 1,800 angstroms and the number of protrusions is in the range of $5 \times 10^5$ to $5 \times 10^8/\text{mm}^2$.

15. The process as claimed in claim 12, wherein said aromatic polyamic acid solution for the coating contains the inorganic particles in an amount of 0.01 to 6 wt. % and said aromatic polyamic acid solution is coated on the surface of the aromatic polyimide gel film in an amount of 1 to 30 wt. % of the gel film on a dry basis.

16. The process as claimed in claim 12, wherein said protrusions have an average diameter of 60 to 1,800 angstroms and the number of protrusions is in the range of $5 \times 10^5$ to $5 \times 10^8/\text{mm}^2$.

17. The process as claimed in claim 13, wherein said protrusions have an average diameter of 60 to 1,800 angstroms and the number of protrusions is in the range of $5 \times 10^5$ to $5 \times 10^8/\text{mm}^2$.

18. The process as claimed in claim 15, wherein said protrusions have an average diameter of 60 to 1,800 angstroms and the number of protrusions is in the range of $5 \times 10^5$ to $5 \times 10^8/\text{mm}^2$.

19. The process as claimed in claim 12, wherein said inorganic particles are colloidal silica.

20. The process as claimed in claim 13, wherein said inorganic particles are colloidal silica.

21. The process as claimed in claim 14, wherein said inorganic particles are colloidal silica.

22. The process as claimed in claim 15, wherein said inorganic particles are colloidal silica.

23. The process as claimed in claim 16, wherein said inorganic particles are colloidal silica.

24. The process as claimed in claim 17, wherein said inorganic particles are colloidal silica.

25. The process as claimed in claim 18, wherein said inorganic particles are colloidal silica.

* * * * *